United States Patent [19]

Cummings et al.

[11] Patent Number: 4,984,293
[45] Date of Patent: Jan. 8, 1991

[54] MULTI-CHANNEL MICROWAVE RECEIVER HAVING SELF-TEST CAPABILITY

[75] Inventors: Kathleen M. Cummings; Russell W. Hanson, both of Melbourne, Fla.

[73] Assignee: Rockwell International Corporation, El Segundo, Calif.

[21] Appl. No.: 423,077

[22] Filed: Oct. 17, 1989

[51] Int. Cl.$^5$ ............................................ H04B 17/00
[52] U.S. Cl. ..................................... 455/133; 455/226; 455/303
[58] Field of Search ............... 455/226, 228, 277, 278, 455/280, 283, 132, 133, 134, 67, 303; 324/73.1, 612

[56] References Cited

U.S. PATENT DOCUMENTS

| | | | |
|---|---|---|---|
| 3,273,065 | 9/1966 | Stover | 455/226 |
| 3,508,156 | 6/1967 | Webb | |
| 3,512,089 | 5/1970 | Cushman | |
| 3,531,722 | 9/1970 | Seibold | |
| 3,909,720 | 9/1975 | Fantera | 455/67 |
| 4,149,122 | 4/1979 | Darato | 455/226 |
| 4,160,211 | 7/1979 | Wiltrock | 455/226 |
| 4,360,928 | 11/1982 | Campbell | 455/226 |
| 4,423,418 | 12/1983 | Pearlman | 455/226 |
| 4,506,385 | 3/1985 | Fedde et al. | |
| 4,626,857 | 12/1986 | Imazeki | 455/226 |
| 4,709,407 | 11/1987 | Baba | 455/226 |

FOREIGN PATENT DOCUMENTS 57-170640  10/1982  Japan .

Primary Examiner—Gerard R. Strecker
Assistant Examiner—Lisa Charouel
Attorney, Agent, or Firm—Gergory G. Williams; M. Lee Murah; H. Fred Hamann

[57] ABSTRACT

A microwave receiver self-test capability which includes at least two channels with each channel including an amplifier and an IF receiver, the microwave receiver, also including a local oscillator capable of mixing with either of said channels for providing an IF signal and a data modulated signal source capable of coupling with said local oscillator through one channel of said microwave receiver and thereby, generating a microwave test signal for the other of said channel of said microwave receiver.

8 Claims, 1 Drawing Sheet

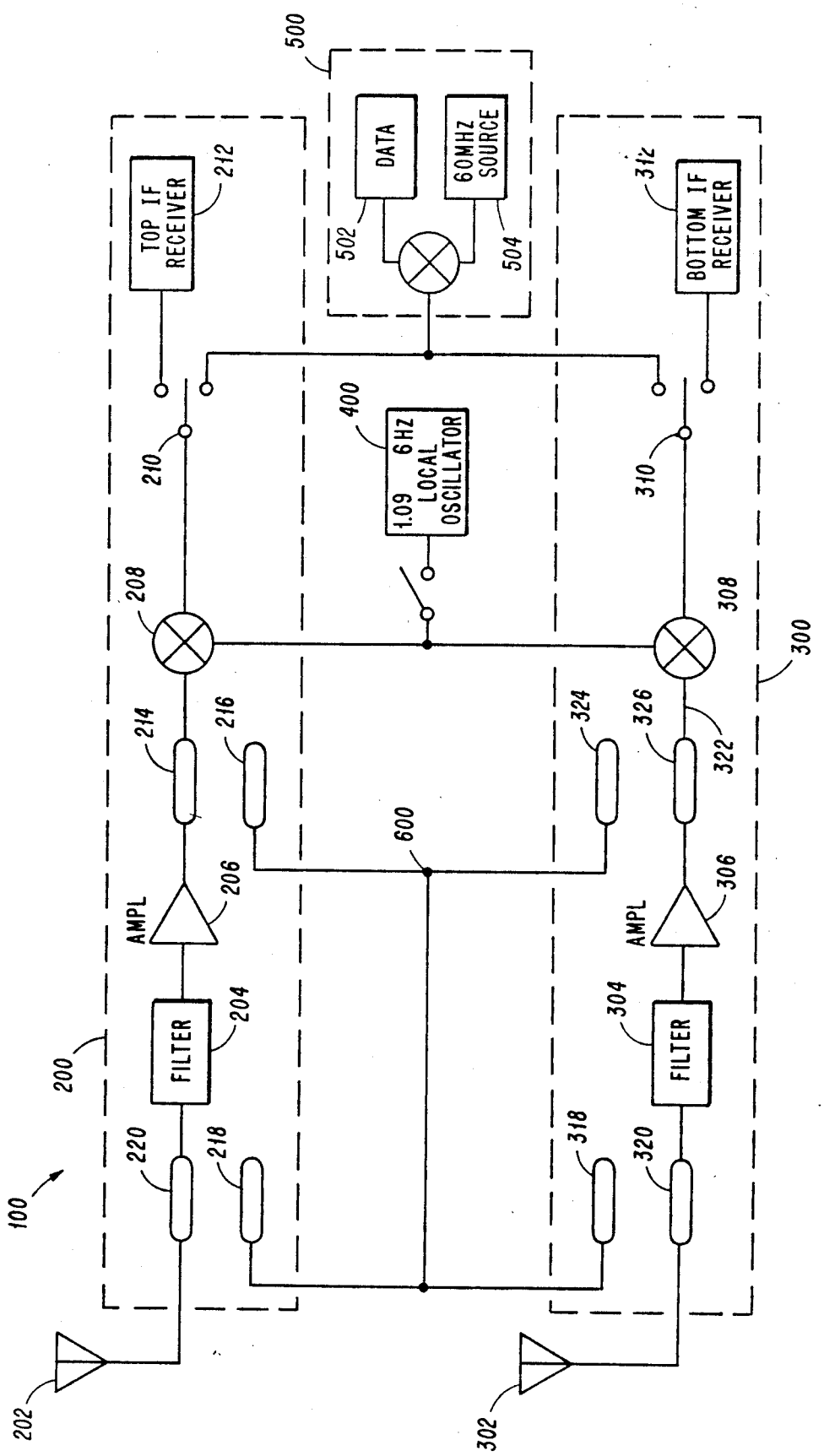

MULTI-CHANNEL MICROWAVE RECEIVER HAVING SELF-TEST CAPABILITY

FIELD OF THE INVENTION

The present invention relates to microwave receivers, and more particularly concerns, multi-channel microwave receivers having self-test capabilities.

BACKGROUND OF THE INVENTION

The increase in complexity of advanced electronic communication equipment has brought with it the need for improved diagnostic methods and built-in-testability to pinpoint a failed module, circuit board or component.

While many digital circuits are readily capable of generating self-test signals for digital circuitry, there still remains a great need for improving RF/microwave built-in-test methods.

In the past, several different methods have been used to test multi-channel microwave receivers. One method typically has been to implement a noise diode, towards the front end of the receiver, which generates a white noise signal which can be filtered, amplified and mixed with a local oscillator, all of which are commonly found at the front end of a typical microwave receiver.

Another method often employed is to provide an injection of a test source into the IF stage of the receiver.

A third method would be to generate a test signal at the desired microwave frequency.

While these, and similar, methods and designs have enjoyed considerable use in the past, they have several serious drawbacks. First, the noise diode is not able to be modulated, in order to emulate an actual signal, and consequently, cannot perform a comprehensive receiver test and can only test system gain and noise figure. Moreover, the noise diode requires active circuitry to minimize loading affects on the operational signal path, which results in increased power consumption and cost and reduced reliability. Similarly, the injection of a test source into the IF stage of the receiver, while allowing signal modulation, does not test the microwave circuitry; thereby, leaving an important portion of the receiver chain untested. Generating a test signal at the desired microwave frequency using a microwave oscillator requires increased power dissipation and cost of the receiver. Since a microwave oscillator alone does not have the required accuracy, the test signal must be phase-locked or multiplied up from a lower frequency source, all of which add to the expense and power consumption of self-test circuit.

Consequently, there exists a need for improvements in microwave receivers which can perform a comprehensive self-test without requiring increased power consumption and cost.

SUMMARY OF THE INVENTION

It is an object of the present invention to provide a low-cost minimal power consumption microwave receiver with self-test capabilities.

It is a feature of the present invention to eliminate noise diodes and microwave switches that use active components.

It is an advantage of the present invention to reduce cost and power consumption of the receiver by eliminating the concomitant active circuitry for minimizing loading affects on the operational signal path.

It is another object of the present invention to provide a receiver having a comprehensive self-test signal generator.

It is another feature of the present invention to provide a modulated test signal at the front end receiver of each channel.

It is another advantage of the present invention to provide a meaningful receiver test from the front end receiver to the digital signal processing circuits.

The present invention provides a microwave receiver having a comprehensive test signal generator which is designed to satisfy the aforementioned needs, produce the earlier propounded objects, include the above described features and achieve the already articulated advantages. The inventions are carried out in a "noise diode-less" system in the sense that no noise diodes are used to generate a test signal. Instead, the present invention uses a predetermined data modulated signal and pre-existing microwave components of one channel to test the performance of the other channel without affecting the normal operating signal path.

Accordingly, the present invention provides a method and apparatus for providing a data modulated test signal through a double balanced mixer of one channel and coupling it over to another channel where it can be used as a test signal.

BRIEF DESCRIPTION OF THE DRAWING

The invention may be better understood by a reading of the description in conjunction with the appended drawing in which:

The FIGURE is a block diagram of dual-channel microwave receiver of the present invention which employs a 60 MHz data modulated source for mixing a local oscillator on one channel and supplying the signal to the front end of the other channel.

DETAILED DESCRIPTION

Now referring to the FIGURE, there is shown a microwave receiver of the invention, generally designated 100.

Throughout this application, the invention is being described as a microwave receiver. However, any radio receiver of any frequency is equally applicable. The radio frequencies are merely a matter of design choice and microwave frequencies have been chosen only for purpose of example.

The microwave receiver 100, is shown having a top channel 200, a bottom channel 300, a local oscillator 400, a data modulated 60 MHz source 500, and a microstrip directional coupler system 600.

Top channel 200 includes a filter 204 coupled to amplifier 206 which is coupled with top mixer 208 which is also coupled with local oscillator 400 and top switch 210. Also associated with top channel 200 is an antenna 202 coupled to filter 204. Top switch 210 is capable of alternately connecting with top IF receiver 212 or data modulated source 500.

Similarly, bottom channel 300 includes a filter 304 which is coupled to amplifier 306, which is coupled with bottom mixer 308 which is also coupled with local oscillator 400 and bottom switch 310. Also associated with bottom channel 300 is an antenna 302 coupled to filter 304. Bottom switch 310 is capable of alternately connecting bottom IF receiver 312 and data modulated source 500.

During normal operation of the receiver 100, switches 210 and 310 are connecting with receivers 212 and 312, respectively. However, during a test of bottom channel 300, switch 210 is changed to connect with data modulated source 500 and switch 310 is connected to bottom IF receiver 312. Likewise, during a test of top channel 200, switch 310 is changed to connect with data modulated source 500. The FIGURE is shown with switches 210 and 310 in a configuration for testing bottom channel 300.

During testing of bottom channel 300, data modulated source 500 is caused to generate a predetermined data modulated 60 MHz signal. Data 502, can be any apparatus capable of generating the desired data which is then modulated with the 60 MHz source 504 in a predetermined fashion. This predetermined data modulated signal is preferably −24 dBm and is sent back through switch 210 to top mixer 208 where it is combined with the 1.09 GHz local oscillator to create the test signal that will be used on the other channel. Couple line 214 which is preferably a microstrip line or a particular capacitor. Disposed above coupler line 214 is coupler line 216. The test signal is coupled to line 216 with preferably a −30 dB change. This signal, now at −54 dBm, on line 216 is connected through the microstrip directional coupler system 600 to coupler line 318. The test signal is coupled from line 318 to line 320 with a −15 dB change, so that, the test signal is at −73 dBm at line 320, which is then input into channel 300 at filter 304. The −73 dBm signal strength is chosen to be preferably 4 dB above Minimum Threshold Level (MTL) which tests receiver sensitivity without generating false failures. Preferably, the test signal is coupled through filter 304, amplifier 306 and mixer 308 and is at −61 dBm at switch 310. Preferably the 60 MHz test signal at switch 310, after mixing it at mixer 308, is at −61 dBm.

The characteristics of couplers throughout is a matter of design choice and the signal strengths mentioned are merely exemplary. However, it is preferred that the test signal strength at line 322 be predominantly attributed to the test signal coupled across lines 318 and 320 and passed through filter 304 and amplifier 306 and not be predominantly attributed to any test signal coupled across lines 324 and 326. To this extent, the designer's choice of couplers, filter and amplifiers are limited.

It is thought that the microwave receiver of the present invention and many of its attendant advantages will be understood from the foregoing description, and it will be apparent that various changes may be made in the form, construction, and arrangement of the parts thereof without departing from the spirit and scope of the present invention, the form herein described being merely preferred or exemplary embodiments thereof.

We claim:

1. An improved multi-channel microwave receiver of the type having a first antenna, a first amplifier coupled with said first antenna, a first amplifier coupled with a first filter, a first mixer coupled with said first amplifier and with a local oscillator, and a first IF receiver coupled with said first mixer, and a second antenna, a second filter coupled with said second antenna, a second amplifier coupled with said second filter, a second mixer coupled with said second amplifier and said local oscillator and a second IF receiver coupled with said second mixer; wherein the improvement comprises:
   means for generating a predetermined data modulated signal;
   means for providing said data modulated signal to said first mixer for mixing with said local oscillator to form a test signal; and
   means for providing said test signal to said second amplifier.

2. A self-testing microwave receiver comprising:
   a first antenna for receiving external signals;
   a first amplifier coupled with said first antenna for amplifying said external signals;
   a local oscillator for generating a predetermined signal;
   a first mixer coupled with said first amplifier and said local oscillator for providing an IF signal;
   a first IF receiver coupled with said first mixer for receiving said IF signal;
   a second antenna for receiving external signals;
   a second amplifier coupled with said second antenna for amplifying said external signals;
   a second mixer coupled with said second amplifier and said local oscillator, for providing an IF signal;
   a second IF receiver coupled with second mixer for receiving said IF signal;
   means for generating a data modulated signal;
   means for coupling said data modulated signal with said first mixer for mixing with said local oscillator and thereby generating a data modulated test signal at microwave frequencies; and,
   means for providing said test signal to said second amplifier.

3. A receiver of claim 2, wherein said means for generating a data modulated signal comprising:
   a 60 MHz source;
   a data signal source; and,
   a mixer for mixing 60 MHz source with said data signal source to create a data modulated source.

4. A receiver of claim 3, wherein said means for providing said test signal to said second amplifier comprises:
   a first coupler coupled with said first mixer for coupling said test signal,
   a second coupler coupled with said second antenna for coupling said test signal; and,
   a connection line coupling said first coupler with said second coupler.

5. A receiver of claim 4, wherein said means for coupling said data modulated signal with said first mixer further comprising a switch.

6. A receiver of claim 5, wherein said local oscillator is a 1.09 GHz oscillator.

7. A microwave receiver comprising:
   a first antenna for receiving external signals;
   a first filter coupled with said antenna for filtering said external signals;
   a first amplifier coupled with said first filter for amplifying said external signals;
   a local oscillator for generating a predetermined signal;
   a first mixer coupled with said first amplifier and said local oscillator for providing an IF signal;
   a first IF receiver coupled with said first mixer for receiving said IF signal;
   a second antenna for receiving external signal;
   a second filter coupled with said second antenna for filtering said external signal;
   a second amplifier coupled with said second filter for amplifying said external signal;
   a second mixer coupled with said second amplifier and said local oscillator for providing an IF signal;
   a second IF receiver coupled with said second mixer for receiving IF signal;
   a 60 MHz source;

a data signal source;
a mixer for mixing said 60 MHz source with said data signal source to create a data modulated source;
a switch for coupling said data modulated source with said first mixer;
a first coupler coupled with said first mixer for coupling a test signal;

a second coupler coupled with said second antenna for coupling said test signal; and
a connection line coupling said first coupler with said second coupler.

8. A receiver of claim 7, wherein said local oscillator comprises a 1.09 GHz.

* * * * *